United States Patent [19]
Takahara et al.

[11] Patent Number: 5,466,928
[45] Date of Patent: Nov. 14, 1995

[54] LIGHT DETECTION DEVICE BONDED TO AN OPTICS HOUSING WHICH INCLUDES TAPERED CAVITIES FOR DELIVERING ADHESIVE TO THE BONDING SURFACE

[75] Inventors: Hiroaki Takahara, Matsudo; Masami Moriya, Kawasaki, both of Japan

[73] Assignee: Nikon Corporation, Tokyo, Japan

[21] Appl. No.: 241,393

[22] Filed: May 11, 1994

[30]     Foreign Application Priority Data

May 20, 1993  [JP]  Japan .................................... 5-118062
May 24, 1993  [JP]  Japan .................................... 5-121150

[51] Int. Cl.⁶ ...................................................... H01J 5/02
[52] U.S. Cl. ........................................... 250/239; 156/291
[58] Field of Search ........................... 250/239; 257/432, 257/433; 359/819, 811; 369/44.14; 156/290, 291

[56]                References Cited

U.S. PATENT DOCUMENTS 4,250,392   2/1981   Leask et al. .............................. 250/505
4,503,604   3/1985   Rediger .................................... 156/291
4,808,812   2/1989   Tanaka et al. ........................... 250/239
5,189,716   2/1993   Matsubara et al. ...................... 385/93
5,194,725   3/1993   Sawase et al. .......................... 250/239
5,351,547  10/1994   Grudzien, Jr. et al. ................... 73/705

*Primary Examiner*—Edward P. Westin
*Assistant Examiner*—Steven L. Nichols

[57]                    ABSTRACT

A light-receiving detection device comprises: an optical device; a light-receiving surface for receiving light transmitted through the optical device; and a holder for holding the optical device with side surfaces and mounting surfaces which intersect with respective side surfaces and to which the light-receiving surface is bonded. Each of said side surface has a concavity (concavities) having at least two inner surfaces, at least one of which is tapered, that is, broadened at the lower portion. The adhesive to bond the light-receiving surface to the holder is applied in the cavity to flow down to the contact area of the light-receiving surface and the holder.

7 Claims, 12 Drawing Sheets

LIGHT DETECTION DEVICE BONDED TO AN OPTICS HOUSING WHICH INCLUDES TAPERED CAVITIES FOR DELIVERING ADHESIVE TO THE BONDING SURFACE

BACKGROUND OF THE INVENTION

1. Field of the Invention

The present invention relates to a light-receiving detection device which consists of a holder for holding an optical system and a light-receiving sensor. More specifically, the present invention relates to the contact positions of said holder and said light-receiving sensor.

2. Related Background Art

Conventionally, after a holder is placed around the light-receiving surface of a light-receiving sensor and its position is adjusted, these two components are assembled into a sub-assembly by applying a quantified amount of adhesive from a dispenser. In this case, a dribble surface is formed in each side of the holder. The adhesive applied on the dribble surface dribbles downward to the boundary of the dribble surface and the contact surface of the light-receiving sensor, which is visually checked.

FIG. 7A is a perspective view in which the holder 1 is placed around the light-receiving surface 2b of the light-receiving sensor 2. And FIG. 7B is an enlarged perspective view showing the contact area of the light-receiving sensor 2 and the holder 1 shown in FIG. 7A. The holder 1 has an upper opening and a lower opening, and an optical path penetrates the holder between these openings. An image-forming optical system (not shown) is held in the optical path.

As shown in FIG. 7B, the dribble surface 1a is formed in the side of the holder 1. FIG. 8 shows the holder 1 and a nozzle discharging the adhesive 3a toward the dribble surface 1a of the holder 1. The light-receiving sensor 2 which is used to detect a focal point is bonded to the holder at two positions. But, for brevity, only one of the two contact areas will be described. As shown in FIG. 7B, the bottom of the holder 1 is brought into contact with the contact surface 2a of the light-receiving sensor 2. And the position of the holder 1 is adjusted. Then, as shown in FIG. 8, the tip 3b of the nozzle 3 is set near the contact surface 2a of the light-receiving sensor 2 to discharge the adhesive 3a from the tip 3b.

The adhesive 3a discharged onto the dribble surface 1a gradually dribbles downward to the boundary between the bottom of the holder 1 and the contact surface 2a of the light-receiving sensor 2, and cures there to bond the holder 1 to the light-receiving sensor 2.

The dribble surface 1a is surrounded by side walls 1c and 1d (see FIG. 7B) and an upside wall 1b (see FIG. 8). These walls prevent the adhesive 3a applied onto the dribble surface 1a from spreading from the dribble surface 1a, and lead the adhesive 3a toward the boundary of the dribble surface 1a and the contact surface 2a of the light-receiving sensor 2.

The behaviour of the adhesive 3a in the vicinity of the boundary will be described with reference to FIG. 11. If adhesive is applied over the boundary C of a vertical surface A and a horizontal surface B, the adhesive is to spread along the boundary C. According to the same principle, the adhesive 3a which is applied onto the dribble surface 1a as shown in FIG. 8 and which dribbles downward to the boundary of the dribble surface 1a and the contact surface 2a spreads along the boundary without spreading over the contact surface 2a. Then, the adhesive which has spread along the boundary cures to bond the holder 1 to the light-receiving sensor 2.

As shown in FIG. 8, however, since the lower part of the tip 3b of the nozzle 3 is set close to the contact surface 2a, the nozzle 3 can easily touch the contact surface 2a. If the tip 3b of the nozzle 3 touches the contact surface 2a while set close to it before the adhesive 3a is discharged, the holder 1 may shift on the contact surface 2a and the subassembly may become a defective.

In order to solve this problem, the tip 3b of the nozzle 3 can be set near the upside wall 1b, as shown in FIG. 9. In this case, however, the adhesive 3a discharged from the tip 3b of the nozzle 3 onto the dribble surface 1a is attracted through and up above the upper part 3c of the tip of the nozzle 3 and the upside wall 1b of the holder 1b; the capillary phenomenon. Once some of the adhesive 3a stays in the cavity between the upside wall 1b and the dribble surface 1a, it attracts the newly discharged adhesive 3a toward the upside wall 1b.

Even when the tip 3b of the nozzle 3 is set closer to the dribble surface 1a as shown in FIG. 10, the adhesive 3b discharged from the tip 3b of the nozzle 3 is also attracted upward according to the capillary phenomenon caused by the upper part 3c of the tip of the nozzle 3 and the upside wall 1b. And also in this case, when a certain amount of the adhesive is discharged, the adhesive 3b on the dribble surface 1a which is attracted upward comes in contact with the upside wall 1b, which attracts the newly discharged adhesive 3a toward the upside wall 1b.

The more adhesive 3a spreads over the upside wall 1b, the stronger the attraction becomes. Thus, the adhesive 3b can not reliably flow down toward the contact surface 2a of the light-receiving sensor 2.

As described above, according to the conventional art, it is very difficult to position the tip of the nozzle, and the holder can not be reliably bonded.

Further, in order to obtain the proper functions of the light-receiving detection device, the holder and the light-receiving sensor to be assembled have to be positioned with high precision. And since the device should work properly in various environments (such as high- or low-temperature, high humidity, or the like), the contact areas of the light-receiving sensor and the holder should be strongly bonded.

Now, a conventional light-receiving detection device will be described with reference to FIGS. 16 to 19.

FIG. 16 is a perspective view of the light-receiving sensor 2 and the holder 1, in which the holder 1 is set around the light-receiving surface 2b of the light-receiving sensor 2. FIG. 17 is an enlarged perspective view showing the contact area of the light-receiving sensor 2 and the holder 1 shown in FIG. 16. The holder 1 shown in FIG. 16 has the upper opening and the lower opening, and the optical path penetrates the holder between these openings. The image-forming optical system (not shown) is held in the optical path. As shown in FIG. 17, a ditch 1b of several tens of ms is formed on the contact surface 1a of the holder 1 which comes in contact with the contact surface 2a of the light-receiving sensor 2 so that the adhesive can spread between these contact surfaces 1a and 2a.

The adhesive 3a is applied along the contact portions of the contact surfaces 1a and 2a as shown in FIG. 18 so that it can flow into the ditch 1b shown in FIG. 17. And when the adhesive cures, the holder 1 is bonded to the light-receiving sensor 2.

As is shown in detail in FIG. 19, however, the ditch 1b is formed only in part of the contact surface 1a of the holder 1 and does not traverse the holder 1 from the side surface 1c to the opening portion. Accordingly, the adhesive 3a applied as shown in FIG. 18 can flow into the ditch 1b shown in FIG. 17 but often can not fill the entire ditch 1b because of the air remaining in the ditch 1b. As a result, the adhesive strength of the holder 1 to the light-receiving sensor 2 may vary. In order to prevent the dispersion in the adhesive property, the application of the adhesive 3a into the ditch 1b is now visually checked. But, it is often difficult to judge whether the adhesive 3a fills the entire ditch 1b shown in FIG. 17 or not from the outside.

SUMMARY OF THE INVENTION

An object of the present invention is to provide a light-receiving detection device which can be easily assembled, wherein the adhesive can certainly dribble down to the boundary of the components to reliably bond them to each other without positioning with high precision the tip of the nozzle discharging the adhesive.

Another object of the present invention is to provide a light-receiving detection device which is strongly and reliably bonded with little dispersion by applying the adhesive to the entire ditch formed in the component(s).

More specifically, the light-receiving detection device according to one aspect of the present invention comprises:

- a holder with an opening portion, contact surfaces (also referred to as "first contact surfaces") provided on both sides of the opening portion, side surfaces provided at a right, obtuse or acute angle to respective first contact surfaces and an optical system held in the holder which leads a light beam to the opening portion; and
- a light-receiving sensor with a light-receiving surface and contact surfaces (also referred to as "second contact surfaces") provided on both sides of the light-receiving surface and brought into contact with respective first contact surfaces.

This light-receiving detection device is further characterized as follows. That is, by bonding the first contact surfaces to the second contact surfaces the holder and the light-receiving sensor are assembled so that the light beam led through the opening portion by the optical system may be incident on the light-receiving surface of the light-receiving sensor to be detected by the sensor.

The holder has concavities formed by cutting at least part of the edges of the side surfaces and the first contact surfaces. These concavities are cut at an obtuse angle with respective first contact surfaces.

Since the concavities are cut at an obtuse angle with the first contact surfaces, the upside walls as shown in FIG. 8 do not have to be formed and the following effects can be obtained.

If the upper part of the tip of the nozzle is set close to one of the concavities formed in the side surface and the adhesive is discharged from the nozzle, some of the adhesive is attracted toward and up above the upper part of the tip of the nozzle as the capillary phenomenon. However, as the upside wall shown in FIG. 8 is not provided, the adhesive attracted upward does not stay on the upside wall, nor the newly discharged adhesive is attracted upward. Accordingly, most of the adhesive discharged into the concavity from the nozzle can reliably flow downward along the sides of the concavity to the contact surface of the light-receiving sensor.

The adhesive further spreads along the boundary of the contact surfaces of the holder and the light-receiving sensor and cures to firmly bond the holder to the light-receiving sensor. Thus, the reliability of the adhesive property can be improved. And at the same time, when the tip of the nozzle is set near the upper part of the concavity, it does not have to be positioned with high precision.

The light-receiving detection device according to the other aspect of the present invention also comprises:

- a holder with an opening portion, first contact surfaces provided on both sides of the opening portion, side surfaces provided at a right, obtuse or acute angle to respective first contact surfaces and an optical system held in the holder which leads a light beam to the opening portion; and
- a light-receiving sensor with a light-receiving surface and second contact surfaces provided on both sides of the light-receiving surface and brought into contact with respective first contact surfaces.

This light-receiving detection device is further characterized in that a ditch is formed on each first contact surface of the holder which penetrates from the side surface to the opening portion.

As the ditch penetrating from the side surface to the opening portion is formed in the first contact surface, the following effects can be obtained.

When the adhesive is applied, as shown in FIG. 18, to the boundary of the first contact surface of the holder and the second contact surface of the light-receiving sensor, the adhesive can flow into the entire ditch because it can push out the air inside the ditch to the opening portion.

As a result, since the adhesive filling the entire ditch cures, the components can be strongly bonded and stably fixed to each other.

DESCRIPTION OF THE PREFERRED EMBODIMENTS

Figure 1A:
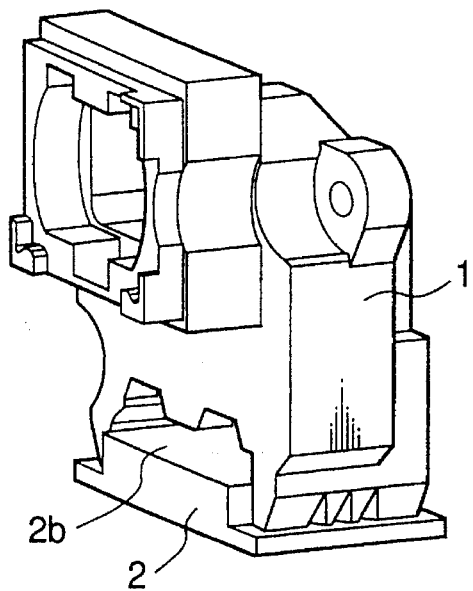
FIG. 1A is a schematic general perspective view of the first embodiment of the light-receiving detection device according to the present invention.
Figure 1B:
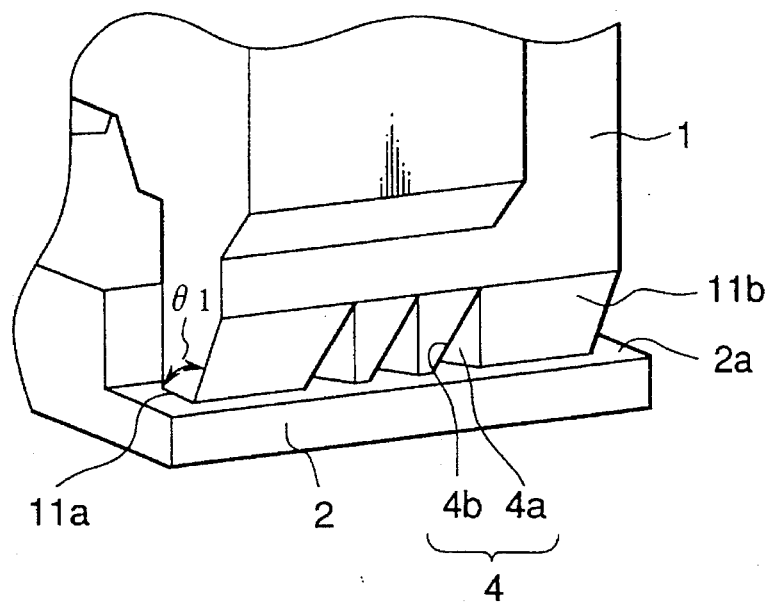
FIG. 1B is an enlarged perspective view showing the contact area of the holder 1 and the light-receiving sensor 2 shown in FIG. 1A.

FIGS. 1A and 1B are perspective views showing the first embodiment of the light-receiving detection device according to the present invention. More specifically, FIG. 1A is a general perspective view of the device, while FIG. 1B is an enlarged perspective view showing the contact area of the holder and the light-receiving sensor 2.

As shown in FIG. 1B, tetrahedral concavities 4 are cut at the edge of the side surface 11b and the contact surface 11a of the holder 11b. Each concavity 4 has a pair of inner surfaces 4a and 4b as shown in FIG. 3.

Figure 2:
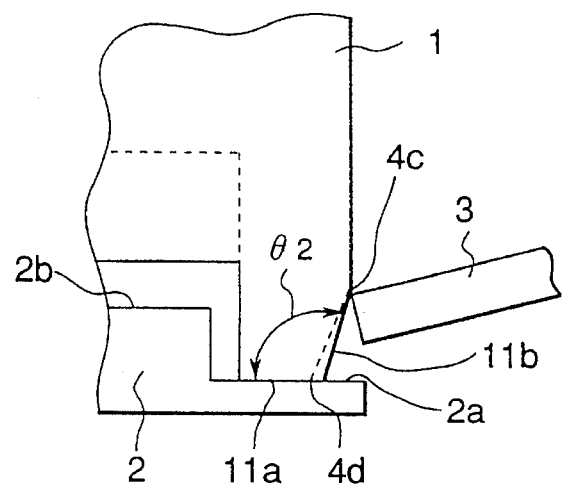
FIG. 2 is an enlarged side view showing the contact area of the holder 1 and the light-receiving sensor 2 shown in FIG. 1A.

The concavity 4 has four apieces: the top apex 4c on the side surface 11b as shown in FIG. 1B, the innermost apex 4d deep in the concavity 4 on the contact surface 11a as shown in FIG. 2 and the other to apieces 4e and 4f on the ridge line (the edge) of the contact surface 11a and the side surface 11b shown in FIG. 1B.

Figure 3:
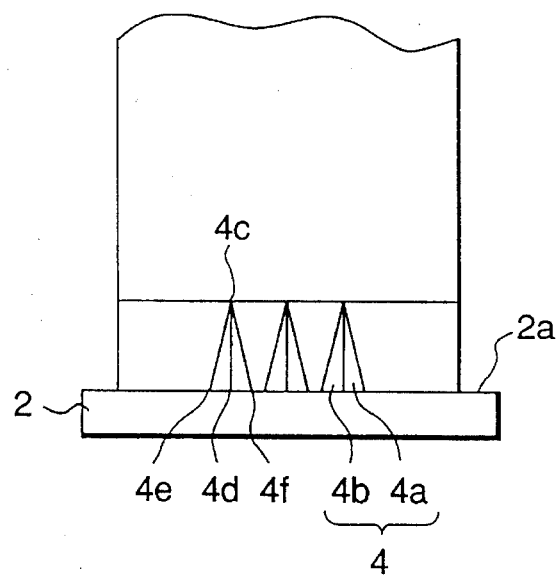
FIG. 3 is an enlarged front view showing the same contact area.

As shown in FIG. 3, the inner surfaces 4a and 4b of each concavity 4 are gradually broadened at the portions opposite to the apex 4c, that is, near the contact surface 2a. At the same time, the concavity becomes deeper on the opposite side of the apex 4c, that is, near the contact surface 2a. Accordingly, the ridge line of the inner surfaces 4a and 4b also goes deeper into the holder 1 as it approaches the contact surface 2a of the light-receiving sensor 2, which facilitates the flow of the adhesive downward to the contact surface 2a and prevents the adhesive from being attracted upward to the apex 4c.

Thus most of the adhesive (not shown in FIG. 2) discharged from the nozzle flows down on the inner surfaces 4a and 4b, more specifically, along the ridge line of the inner surfaces 4a and 4b toward the contact surface 2a. And after reaching the contact surface 2a, the adhesive spreads along the boundary of the inner surfaces 4a and 4b and the contact surface 2a, and cures to filmly fix the holder 1 to the light-receiving sensor 2.

Since the upside wall 1b which can attract the adhesive is not formed, even a small amount of adhesive discharged from the nozzle can certainly flow down along the ridge line of the inner surfaces 4a and 4b to the contact surface as described, and can spread along the boundary of the inner surfaces 4a and 4b and the contact surface 2a to cure to firmly fix the holder 1 to the light-receiving sensor as well.

Figure 4:
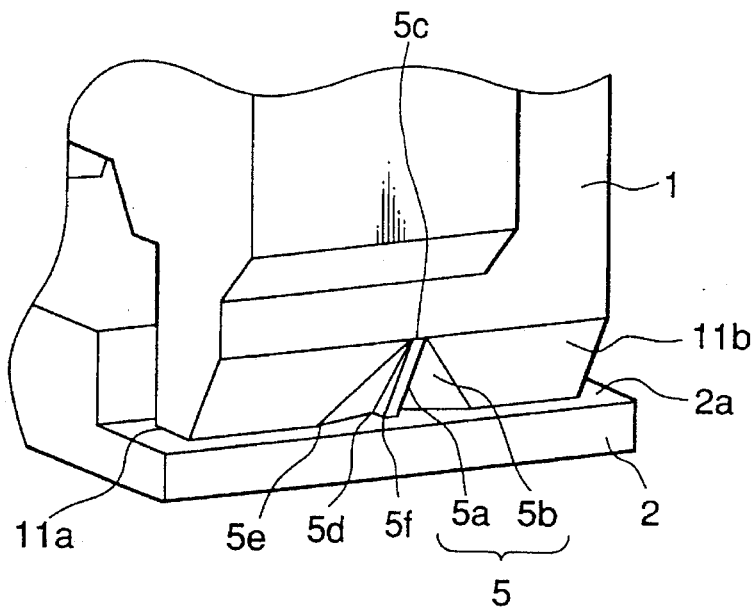
FIG. 4 is an enlarged perspective view showing the contact area of the second embodiment of the light-receiving detection device according to the present invention.

FIG. 4 is an enlarged perspective view showing the contact area of the second embodiment of the light-receiving detection device according to the present invention.

As shown in FIG. 4, concavities 5 are cut at the edge of the side surface 11b and the first contact surface 11a of the holder 1. Each concavity 5 has four apieces: the top apex 5c on the side surface 11b, the innermost apex 5d deep in the concavity 5 on the contact surface 11a of the holder 1 and the other two apieces 5e and 5f on the ridge line (the edge) of the side surface 11b and the contact surface 11a.

When the adhesive is discharged from the nozzle whose tip's upper part is set close to the top apex 5c, in the same way as shown in FIG. 2, of the concavity 5 shown in FIG. 4 having the shape described above, most of the discharged adhesive can flow down on the inner surfaces 5a and 5b of the concavity 5, more specifically, along the ridge line of the inner surfaces 5a and 5b to the boundary of the holder 1 and the light-receiving sensor 2. And the inner surfaces 5a and 5b are broaden at the opposite sides of the top apex 5c, that is, near the contact surface 11a, which facilitates the flow of the adhesive toward the boundary.

Since a plurality of concavities 5 are aligned as shown in FIG. 4, the nozzle does not have to be positioned with high precision in the horizontal direction.

Figure 5:
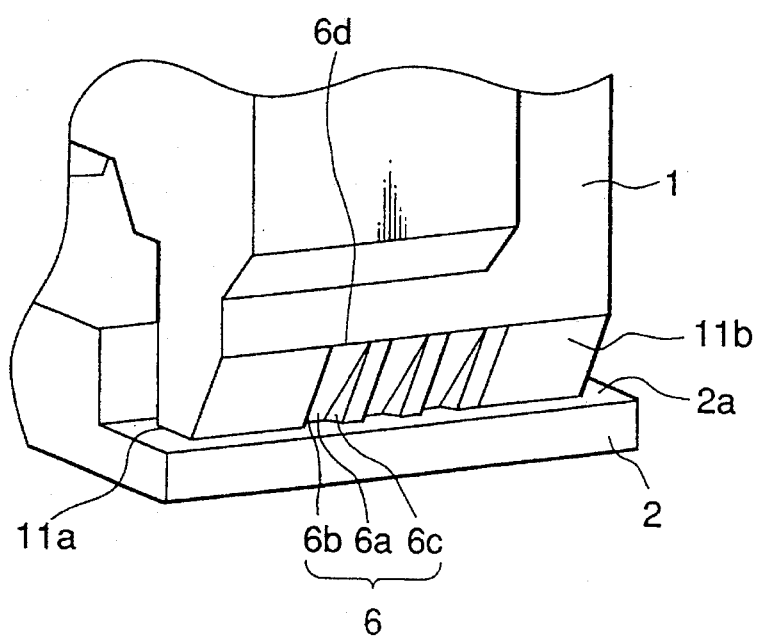
FIG. 5 is an enlarged perspective view showing the contact area of the third embodiment of the light-receiving detection device according to the present invention.
Figure 6:
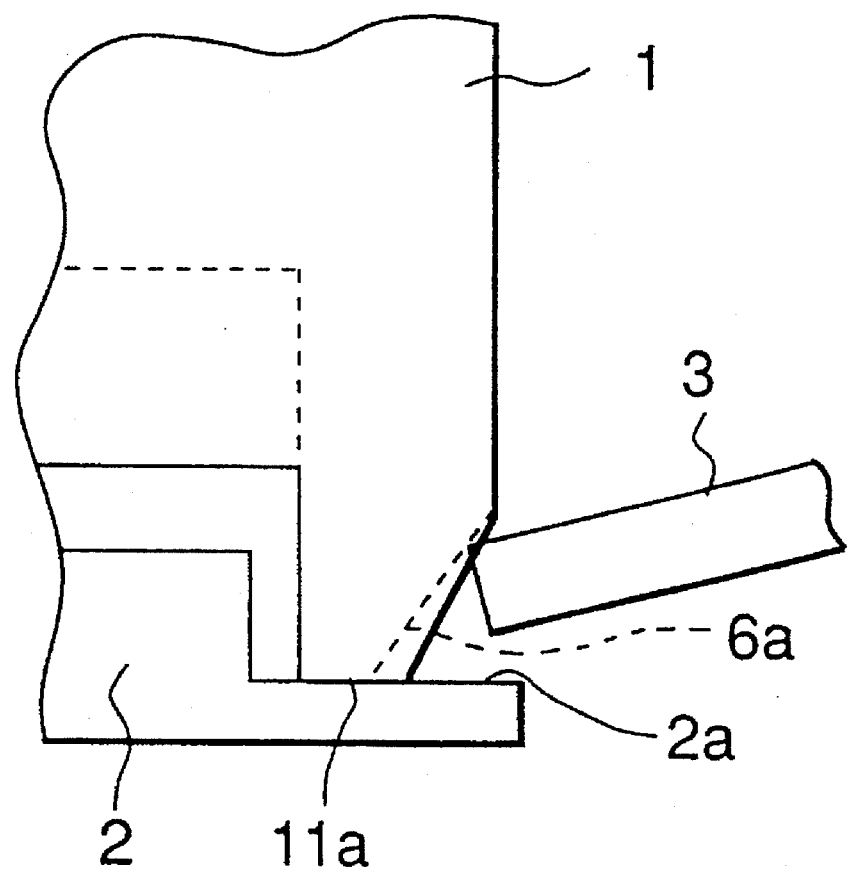
FIG. 6 is an enlarged side view showing the third embodiment of the light-receiving detection device according to the present invention, in which the nozzle 3 is set deep in the concavity 6.
Figure 7A:
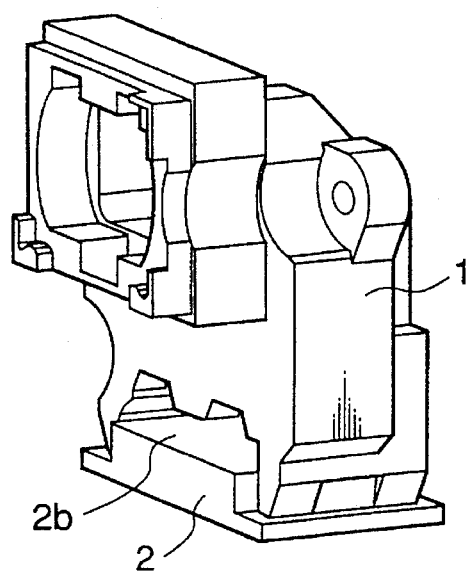
FIG. 7A is a schematic general perspective view of a conventional light-receiving detection device.
Figure 7B:
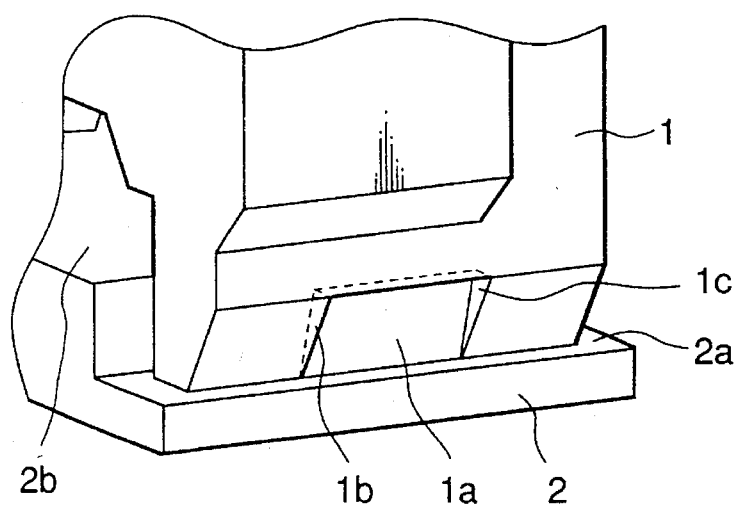
FIG. 7B is an enlarged perspective view showing the contact area of the holder 1 and the light-receiving sensor 2 shown in FIG. 7A.

FIG. 5 is an enlarged perspective view showing the contact area of the third embodiment of the light-receiving detection device according to the present invention. As shown in this figure, wedge-shaped concavities are cut at the edge of the side surface 11b and the contact surface 11a of the holder 1. Each concavity has an inner surface 6a making an obtuse angle with the contact surface 11a, and triangular side walls on both sides of the inner surface 6a which stand at an angle of about 90° to the contact surface 1a.

When the adhesive is discharged from the nozzle (not shown in FIG. 5) whose tip's upper part is set near the upper part of the inner surface 6a shown in FIG. 5, in the same way as shown in FIG. 2, some of the adhesive is attracted toward the upper part of the tip of the nozzle as the capillary phenomenon. But, since the concavity 6 formed as described above does not have the upside surface 1b described before, the adhesive attracted up to the boundary of the inner surface 6a and the side surface 11b of the holder 1 does not stay there but spreads along the boundary. As the adhesive does not stay near the boundary nor strongly attract the newly discharged adhesive, most of the discharged adhesive flows down along the inner surface 6a and the side walls 6b and 6c, especially along the boundaries of the inner surface 6a and the side walls 6b and 6c. After reaching the boundary of the holder 1 and the light-receiving sensor 2, the adhesive spreads along the boundary and cures to firmly bond the holder 1 to the light-receiving sensor 2.

Figure 8:
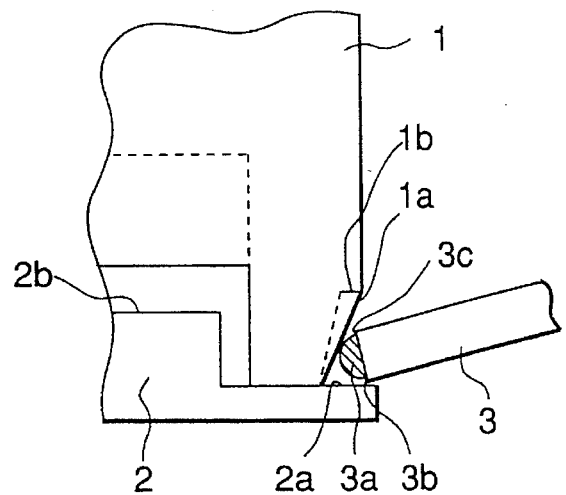
FIG. 8 is an enlarged side view showing the holder 1 and the light-receiving sensor 2 shown in FIG. 7B, in which the adhesive 3a is discharged from the nozzle 3 whose tip is set close to the contact surface 2a of the light-receiving sensor 2.
Figure 9:
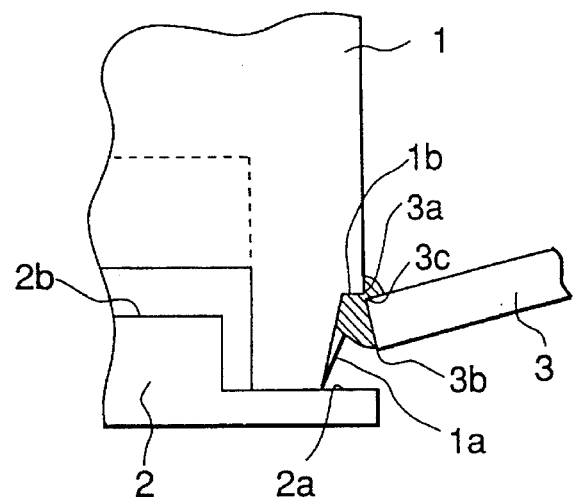
FIG. 9 is an enlarged side view showing the holder 1 and the light-receiving sensor 2 shown in FIG. 7B, in which the adhesive 3a is discharged from the nozzle 3 whose tip is set near the upper part of the dribble surface 1a of the holder 1.
Figure 10:
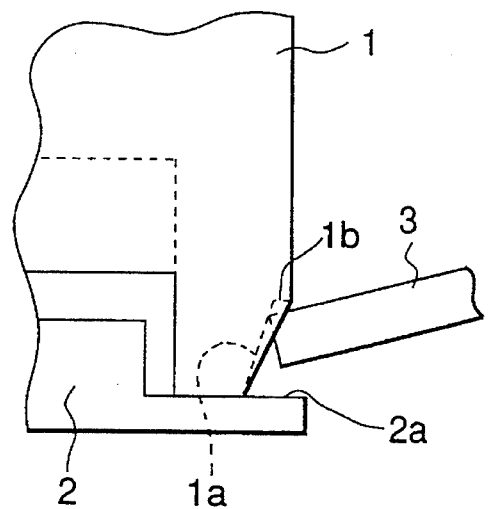
FIG. 10 is an enlarged side view showing the holder 1 and the light-receiving sensor 2 shown in FIG. 7B, in which the tip of the nozzle 3 is set deeply close to the dribble surface 1a of the holder 1.
Figure 11:
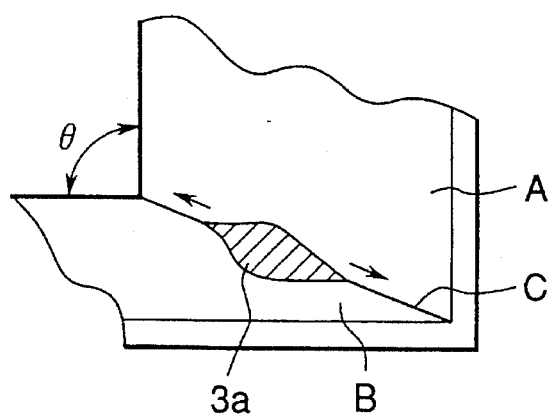
FIG. 11 is a view explaining the behaviour of the adhesive at the boundary of the holder 1 and the light-receiving sensor 2.

The upper part of the tip of the nozzle may be set deep inside the cavity 6 shown in FIG. 5 toward its inner surface 6a. In this case also some of the adhesive discharged from the tip of the nozzle is attracted toward and up above the upper part of the tip of the nozzle as the capillary phenomenon. But, as the upside surface 1b shown in FIG. 8 is not formed, the adhesive staying around the upper part of the tip of the nozzle could not touch the upside surface 1b nor be attracted by the upside surface 1b. Thus, most of the discharged adhesive can spread over the inner surface 6a toward the side walls 6b and 6c and down to the boundary of the holder 1 and the light-receiving sensor 2.

The adhesive which reaches the side walls 6b and 6c flows down along these side walls and along the boundaries with the inner surface 6a to the boundary of the holder 1 and the light-receiving sensor 2. The adhesive which thus reaches the boundary of the holder 1 and the light-receiving sensor 2, together with the adhesive which flows down along the inner surface 6a to the boundary, spreads along the boundary and cures to bond the holder 1 to the light-receiving sensor 2.

In each of the above-mentioned first, second and third embodiments, a plurality of concavities are formed so as to be aligned along the contact surface 11b of the holder 1. As a result, even when the position of the tip of the nozzle set as shown in FIG. 2 shifts in the horizontal direction, the adhesive can be applied at least to one of the concavities. In other words, the nozzle does not have to be positioned with high precision with respect to the horizontal direction.

Though in the above-mentioned first and second embodiments each spindle-shaped concavity has two triangular inner surfaces and also a triangular bottom cross section, the edge of the side surface 11b and the contact surface 11a of the holder 1 may be cut to form differently shaped concavities, each of which has three triangular inner surfaces. More specifically, the bottom of each concavity is rectangular or square with two apieces deep on the contact surface 11a and the other two at the edge of the contact surface 11a and the side surface 11b. And the top apex around which all the three inner surfaces gather is on the side surface 11b of the holder 1.

And though in the above-mentioned embodiments the side surface 11b and the contact surface 11a of the holder 1 make an obtuse angle $\theta_1$ with each other, they may make a right or acute angle. In this case also, the concavities formed as shown in FIG. 1B, 4 or 5 enable the adhesive to reliably flow down to the boundary of the concavities and the contact surface of the light-receiving sensor.

According to the above-mentioned aspect of the present invention, it is easy to apply a small amount of adhesive to the small components to be bonded to each other because the applied adhesive can certainly flow and spread over desired portions of the components to be assembled. In addition, the tip of the nozzle for discharging the adhesive can be easily positioned.

Figure 12:
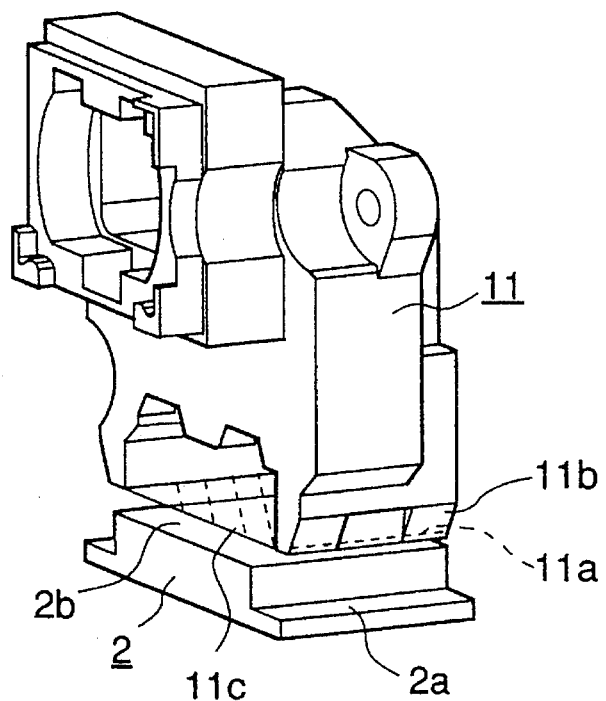
FIG. 12 is a schematic perspective view showing another embodiment of the light-receiving detection device according to the present invention.
Figure 13:
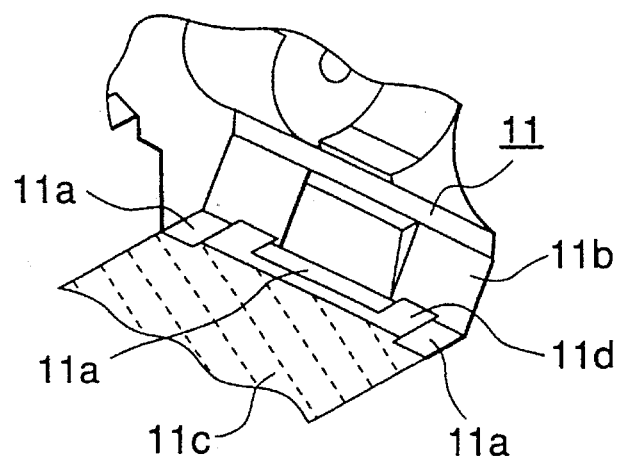
FIG. 13 is an enlarged perspective view clearly illustrating the shape of the ditch 11d formed in the contact surface 11a of the holder 11 shown in FIG. 2.

FIGS. 12 and 13 are perspective views showing another embodiment of the light-receiving detection device according to the present invention. As shown in FIG. 13 a ditch 11d formed in the contact surface 11a of the holder 11 traverses the holder 11 from the side surface 11b to the opening portion 11c. The behavior of the adhesive flowing into this ditch 11d is the same as described before, and the description thereof is omitted here.

Figure 14:
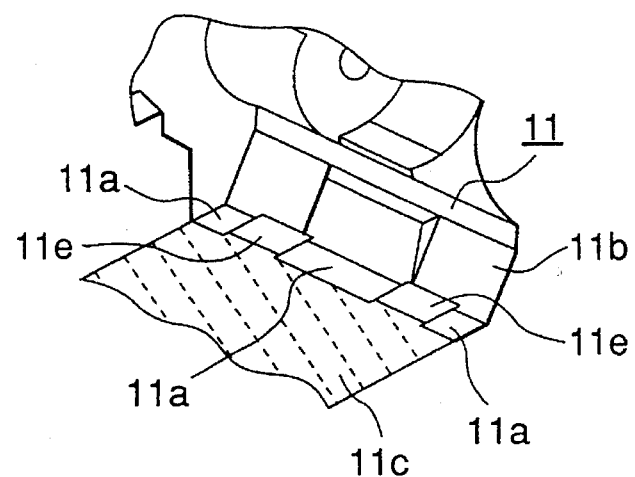
FIG. 14 is an enlarged perspective view clearly illustrating a ditch 11e of still another embodiment according to the present invention, wherein the shape of the ditch 11e is different from that of the ditch 11d shown in FIG. 13.
Figure 18:
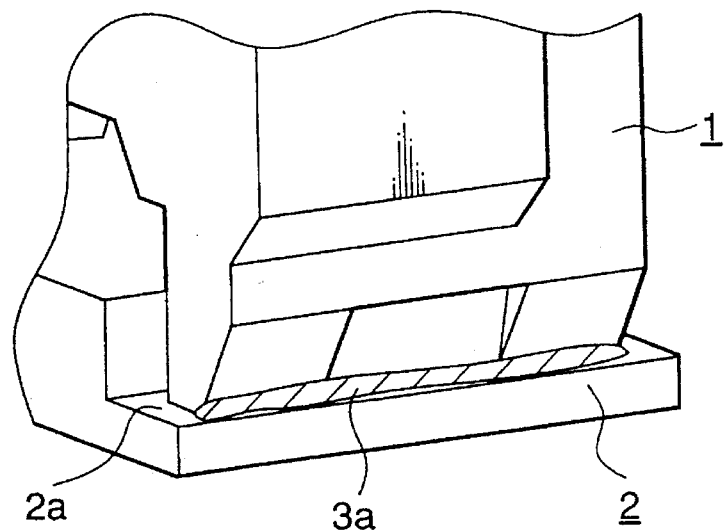
FIG. 18 is an enlarged perspective view showing the contact area shown in FIG. 16 to which the adhesive a is applied.
Figure 19:
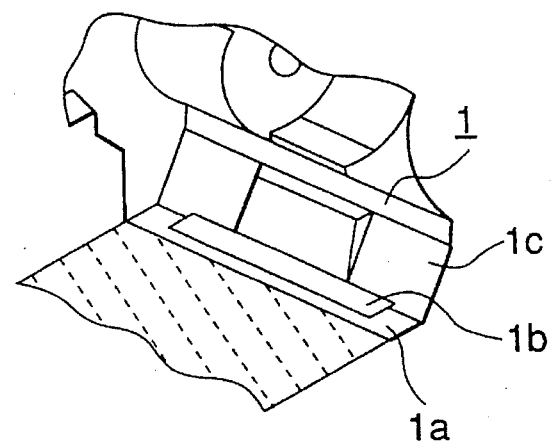
FIG. 19 is a schematic perspective view clearly illustrating the shape of the ditch 1b formed on the contact surface 1a of the holder 1 shown in FIG. 17.

FIG. 14 is a perspective view showing still another embodiment of the light-receiving detection device according to the present invention, in which two ditches 11e traversing the holder 11 from the side surface 11b to the opening portion 11c are formed in the contact surface 11a of the holder 11. When the holder 11 having the ditches 11e thus formed is put on the contact surface 2a of the light-receiving sensor 12 shown in FIG. 12 and the adhesive is applied as shown in FIG. 18, the adhesive flows into the ditches 11e while pushing out the air inside the ditches 11e to the opening portion (11c) of the holder 11. As no air remains in the ditches 11e, they can be completely filled with the adhesive.

As a result, the adhesive filling the entire ditches 11e cures to filmly fix these components 2 and 11 to each other.

Figure 15:
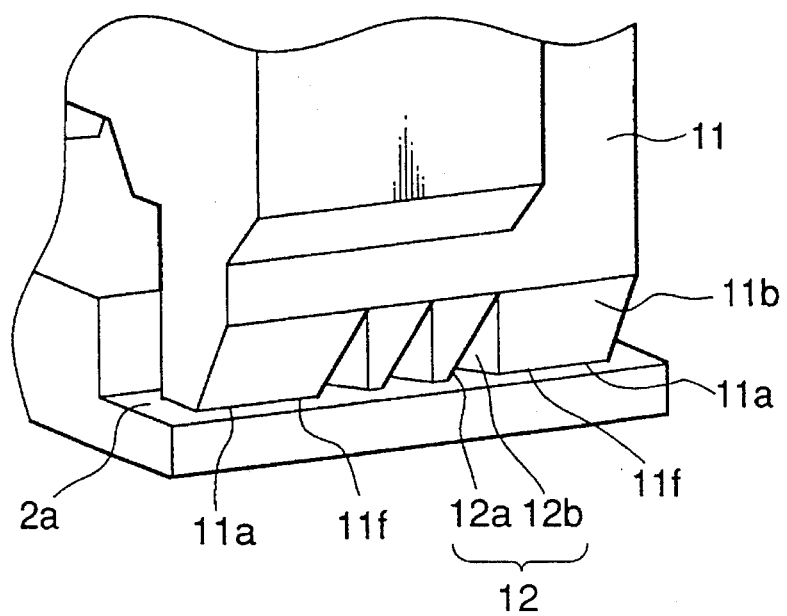
FIG. 15 is an enlarged perspective view showing the contact area of still another embodiment of the light-receiving detection device according to the present invention.
Figure 16:
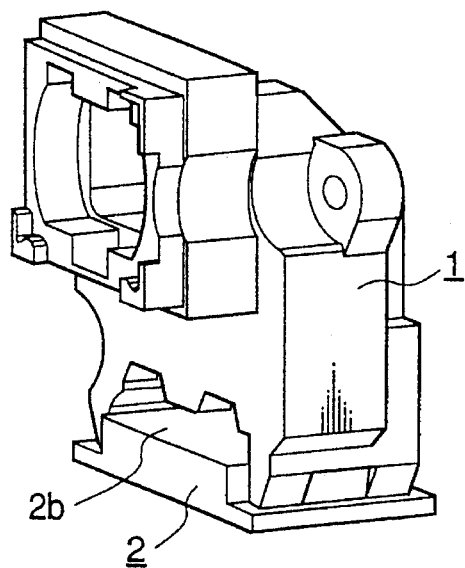
FIG. 16 is a schematic perspective view showing a conventional light-receiving detection device.
Figure 17:
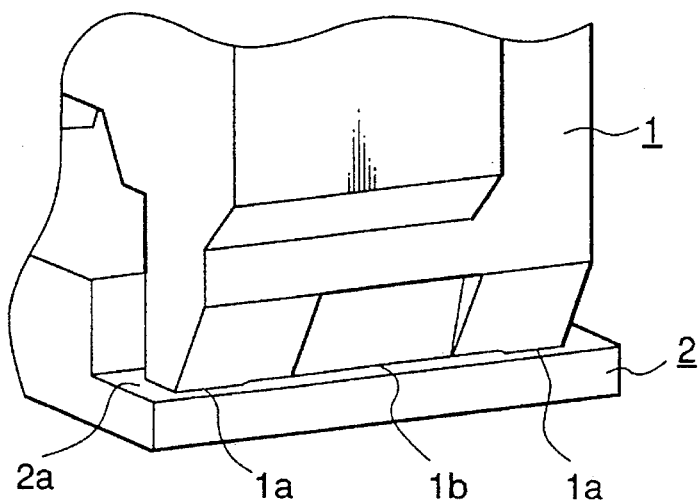
FIG. 17 is an enlarged perspective view showing the contact area of the holder 1 and the light-receiving sensor 2 shown in FIG. 16.

FIG. 15 is an enlarged perspective view showing the contact area of still another embodiment of the light-receiving detection device according to the present invention, in which a plurality of tetrahedral concavities 12 are formed so as to be aligned along the side surface 11b of the holder 11. Accordingly, as described before, the nozzle (not shown) for discharging the adhesive can be set away from the contact surface 2a of the light-receiving sensor 2 so that the adhesive is prevented from touching the contact surface 2a.

For, though the adhesive 3a is applied to the boundary of the contact surfaces 1a and 2a of the two components to be bonded in the embodiment shown in FIG. 18, the adhesive according to this embodiment may be applied to the inner surfaces 12a and 12b of each tetrahedral concavity 12 shown in FIG. 15. And then, the adhesive thus applied flows down to the boundary of the inner surfaces 12a and 12b and the contact surface 2a of the light-receiving sensor 2, and spreads along the boundary.

The reference numerals 11f in FIG. 15 indicate a ditch 11f (of the same type as the ditch 11d in FIG. 13) or ditches 11f (of the same type as the ditches 11e in FIG. 14) formed in the contact surface 11a of the holder 11. As described before, the adhesive spreading along the boundary of the holder 1 and the contact surface 2a of the light-receiving sensor 2 flows into the ditch(es) 11f shown in FIG. 15 while pushing out the air inside. Since the holder 11 is traversed by the ditch(es) 11f from the side surface 11b to the opening portion 11c as shown in FIG. 13 or 14, the air cannot remain inside the ditch(es) 11f but is pushed out to the opening portion 11c of the holder 11. As a result, as described before, the adhesive can fill the entire ditch(es) 11f and cure to filmly bond the holder 11 to the light-receiving sensor 2.

According to the above-mentioned aspect of the present invention, the holder for holding the optical system can be filmly bonded and fixed to the light-receiving sensor, thereby improving the reliability of the functions of the sub-assembly.

Figure 20:
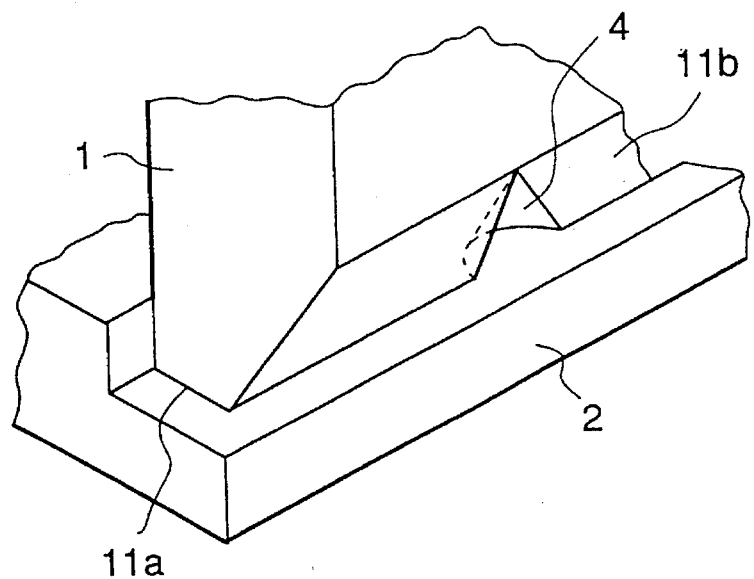
FIG. 20 is an enlarged perspective view showing the contact area of still another embodiment of the light-receiving detection device according to the present invention.

FIG. 20 is a perspective view showing another embodiment, of which only the portions different from those of the embodiment shown in FIG. 1B will be described while description of the same portions is omitted. In FIG. 20, the edge of the side surface 11b and the contact surface 11a of the holder 1 is cut to form a concavity 4 having a curved inner surface, which is a part of a circular cone. The function of this concavity 4 is the same as that of the embodiment shown in FIG. 1B.

Figure 21:
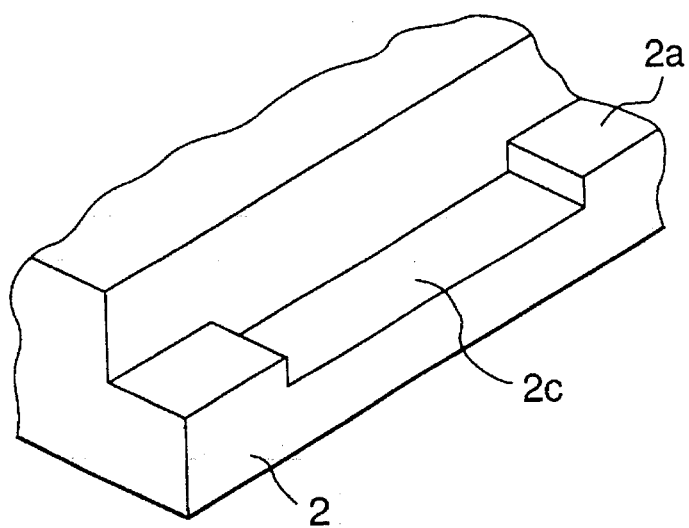
FIG. 21 is an enlarged perspective view showing the contact surface of the light-receiving sensor of still another embodiment according to the present invention.

FIG. 21 is a perspective view showing still another embodiment, of which only the portions different from those of the embodiment shown in FIG. 13 will be described while description of the same portions is omitted. In FIG. 21, a ditch 2c is formed on a part of the contact surface 2a of the light-receiving sensor 2 which comes in contact with the holder (not shown). Note that though in FIG. 21 the depth of the ditch 2c is exaggerated for the purpose of explanation, the depth is in fact in the order of several tens of ms. The ditch 2c also facilitates the flow of the adhesive between the contact surfaces. Incidentally, also in this embodiment, the holder 11 having the ditch shown in FIG. 13 may be used.

What is claimed is:

1. A light-receiving detection device comprising:
an optical system for transmitting light;
a light-receiving surface for receiving light transmitted through the optical system;
a holder for holding the optical system, the holder being provided with at least one side surface having at least one mounting surface, depending from the at least one side surface, to which the light-receiving surface is bonded, each side surface being provided with at least one concavity for receiving adhesive to bond said light-receiving surface to the at least one mounting surface, the concavity having at least two inner surfaces, at least one of the inner surfaces being tapered so as to broaden at a lower part.

2. A light-receiving detection device comprising:
an optical system for transmitting light;
a light-receiving surface for receiving light transmitted through the optical system;
a holder for holding the optical system, the holder being provided with at least one side surface having at least one mounting surface, depending from the at least one side surface, to which the light-receiving surface is bonded, each side surface being provided with a concavity for receiving adhesive to bond said light-receiving surface to the at least one mounting surface, each concavity having a curved inner surface which broadens at a lower part of the side surface.

3. A light-receiving detection device comprising:
a holder provided with an opening, the holder including:
first contact surfaces being provided on the sides of the opening and
side surfaces intersecting with the first contact surfaces which holds an optical system for leading a light beam toward the opening at least part of an edge of the side surface and the first contact surface being cut to form at least one concavity having inner surfaces which form obtuse angles with the first contact surface; and
a light-receiving sensor with a light-receiving surface in communication with the opening and second contact surfaces provided on the sides of the light-receiving surface bonded to the first contact surfaces the light-receiving sensor detecting the light beam transmitted through the optical system and the opening being incident on the light-receiving surface.

4. A light-receiving detection device according to claim 3, wherein said concavity is a tetrahedral, the concavity having a top apex on the side surface formed on the edge of the side surface and the first contact surface of the holder, the innermost apex deep on the first contact surface and two apieces on the edge of the first contact surface and the side surface.

5. A light-receiving detection device according to claim 3, wherein said concavity has a shape of a triangle put sideways formed on the edge of the side surface and the first contact surface of the holder the concavity having an inner surface making an obtuse angle with the first contact surface and having two triangular side walls provided on both sides of the inner surface at an angle of about 90° with the first contact surface.

6. A light-receiving detection device comprising:
an optical system for transmitting light;
a light-receiving surface for receiving light transmitted through the optical system;
a holder for holding the optical system, the holder being provided with an inner side surface, an outer side surface and a mounting surface dependent from said inner and outer side surfaces, the light-receiving surface being bonded to the mounting surface;
at least one of the mounting surface and the light-receiving surface being provided with ditches formed so as to traverse the light-receiving surface and the holder from the inner side surface to the outer side surface of the holder, the ditches being adapted to allow an adhesive to bond the light-receiving surface of the holder by flowing through the ditches from one of the outer side surface and the inner side surface of the holder and such that the air between the light-receiving surface and the holder can escape through the ditches to one of the inner side surface and the outer side surface of the holder.

7. A light-receiving detection device comprising:
a holder provided with an opening, the holder including:
first contact surfaces provided on the sides of the opening; and
side surfaces intersecting with the first contact surfaces which holds an optical system for leading a light beam toward the opening, the first contact surfaces have ditches traversing the holder from the side surfaces to the opening portion; and
a light-receiving sensor with a light-receiving surface in communication with the opening and second contact surfaces provided on both sides of the light-receiving surface bonded to the first contact surfaces, the light-receiving sensor detecting the light beam transmitted through the optical system and the opening portion and incident on the light-receiving surface.

* * * * *